United States Patent
Hepp

(10) Patent No.: US 9,651,575 B2
(45) Date of Patent: May 16, 2017

(54) METHOD AND APPARATUS FOR TESTING A SENSOR

(71) Applicant: Sercel, Inc., Houston, TX (US)

(72) Inventor: John Hepp, Leander, TX (US)

(73) Assignee: SERCEL INC., Houston, TX (US)

(*) Notice: Subject to any disclaimer, the term of this patent is extended or adjusted under 35 U.S.C. 154(b) by 285 days.

(21) Appl. No.: 14/063,290

(22) Filed: Oct. 25, 2013

(65) Prior Publication Data

US 2015/0114079 A1     Apr. 30, 2015

(51) Int. Cl.
| | | |
|---|---|---|
| G01P 21/00 | (2006.01) | |
| G01V 13/00 | (2006.01) | |
| G01H 3/00 | (2006.01) | |

(52) U.S. Cl.
CPC .............. *G01P 21/00* (2013.01); *G01V 13/00* (2013.01); *G01H 3/005* (2013.01); *G01V 2210/14* (2013.01)

(58) Field of Classification Search
USPC ........................................ 73/1.37–1.38, 1.82
See application file for complete search history.

(56) References Cited

U.S. PATENT DOCUMENTS

| | | | | |
|---|---|---|---|---|
| 2,788,654 | A | * 4/1957 | Wiancko | G01P 21/00 73/1.38 |
| 3,372,572 | A | * 3/1968 | Campbell | G01P 21/00 73/1.87 |
| 4,188,816 | A | * 2/1980 | Mairson | F41G 7/00 73/1.38 |
| 6,196,048 | B1 | * 3/2001 | Kunimi | G01P 21/00 73/1.38 |
| 2011/0051109 | A1 | * 3/2011 | Emoto | G03B 27/32 355/53 |

FOREIGN PATENT DOCUMENTS

JP              63250573 A    * 10/1988

\* cited by examiner

*Primary Examiner* — Helen Kwok
*Assistant Examiner* — Nashmiya Fayyaz
(74) *Attorney, Agent, or Firm* — Patent Portfolio Builders PLLC

(57) ABSTRACT

There is a testing device for testing a sensor. The testing device includes a rotating mechanism; a first rotating plate connected to the rotating mechanism so that the first rotating plate rotates around an orbital axis (Z1); a second plate rotatably attached to the first rotating plate at a rotating point, the second plate having a rotational axis (Z2) offset from the orbital axis (Z1) by a predetermined distance R; and a gripping mechanism attached to the second plate and configured to receive and fix the sensor relative to the second plate. The second plate follows a circular trajectory with constant attitude around the orbital axis (Z1).

16 Claims, 12 Drawing Sheets

METHOD AND APPARATUS FOR TESTING A SENSOR

BACKGROUND

Technical Field

Embodiments of the subject matter disclosed herein generally relate to methods and systems and, more particularly, to mechanisms and techniques for testing an accelerometer to be used for seismic data acquisition.

Discussion of the Background

Marine seismic data acquisition and processing generate a profile (image) of the geophysical structure (subsurface) under the seafloor. While this profile does not provide an accurate location for the oil and gas reservoirs, it suggests, to those trained in the field, the presence or absence of reservoirs. Thus, providing a high-resolution image of the subsurface is an ongoing process for the exploration of natural resources, including, among others, oil and/or gas.

During a seismic gathering process, a seismic survey system 100, as shown in FIG. 1, includes a vessel 102 that tows plural receivers 104 distributed along a streamer 106. Vessel 102 may tow plural streamers 106 at the same time. The streamers may be disposed horizontally, i.e., lying at a constant depth $z_1$ relative to the ocean surface 110. Also, the plural streamers 116 may form a constant angle (i.e., the streamers may be slanted) with respect to the ocean surface as disclosed in U.S. Pat. No. 4,992,992, the entire content of which is incorporated herein by reference. Alternatively, the streamers may have a variable-depth profile, as described in U.S. patent application Ser. No. 13/464,149, the entire content of which is incorporated herein by reference.

Still with reference to FIG. 1, each streamer may have a head float 106a and a tail buoy 106b connected to its respective ends for maintaining given depth $z_1$. A front-end gear 112 that includes various cables connects streamers 106 to vessel 102. Vessel 102 also tows a sound source 120 configured to generate an acoustic wave 122a. Acoustic wave 122a propagates downward and penetrates the seafloor 124, eventually being reflected by a reflecting structure 126 (reflector). The reflected acoustic wave 122b propagates upwardly and is detected by detector 104. For simplicity, FIG. 1 shows only one path 122a corresponding to the acoustic wave. However, the acoustic wave emitted by source 120 may be a substantially spherical wave, e.g., it propagates in all directions starting from source 120. Parts of reflected acoustic wave 122b (primary) are recorded by the various sensors 104 (recorded signals are called traces) while parts 122c of reflected wave 122b pass the sensors 104 and arrive at the water surface 110. Since the interface between the water and air is well approximated as a quasi-perfect reflector (i.e., the water surface acts as a mirror for acoustic waves), reflected wave 122c is reflected back toward another detector 104 as shown by wave 122d in FIG. 1. Wave 122d is normally referred to as a ghost wave because it is due to a spurious reflection. Ghosts are also recorded by sensors 104, but with a reverse polarity and a time lag relative to primary wave 122b. The ghost's degenerative effects upon arrival on seismic bandwidth and resolution are known. In essence, interference between primary and ghost arrivals causes notches, or gaps, in the frequency content the detectors record, which reduces useful bandwidth.

Recorded traces (recorded with sensors 104, e.g. hydrophones that record a pressure change or accelerometers that record particle motions) may be used to determine an image of the subsurface (i.e., earth structure below surface 124).

However, to produce a high-quality subsurface image, seismic sensors like motion sensors used in the streamer need to be checked to perform as designed, i.e., have actual characteristics conforming to design characteristics envisioned by the design engineer.

Thus, there is a need to have an apparatus and method that can easily and efficiently test one or more features of a sensor prior to using it in the field.

SUMMARY

According to an embodiment, there is a testing device for testing a sensor. The testing device includes a rotating mechanism; a first rotating plate connected to the rotating mechanism so that the first rotating plate rotates around an orbital axis (Z1); a second plate rotatably attached to the first rotating plate at a rotating point, the second plate having a rotational axis (Z2) offset from the orbital axis Z1 by a predetermined distance R; and a gripping mechanism attached to the second plate and configured to receive and fix the sensor relative to the second plate. The second plate follows a circular trajectory with constant attitude around the orbital axis (Z1).

According to another embodiment, there is a testing device that includes a sensor plate configured to follow a circular trajectory with constant attitude; and a gripping mechanism attached to the sensor plate and configured to receive a sensor.

According to still another embodiment, there is a method for testing a sensor. The method includes fixedly attaching the sensor to a support plate that follows a circular trajectory with constant attitude around an orbital axis (Z1) while a rotating plate rotates about the orbital axis (Z1), wherein the support plate is rotatably connected to the rotating plate at a rotating axis (Z2); rotating the rotating plate with a rotating mechanism about the orbital axis (Z1) so that the sensor rotates in a circle; measuring an output signal of the sensor while rotating in circle with a fixed frequency; and determining that the sensor is working when the output signal has a sinusoidal curve and a given amplitude.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
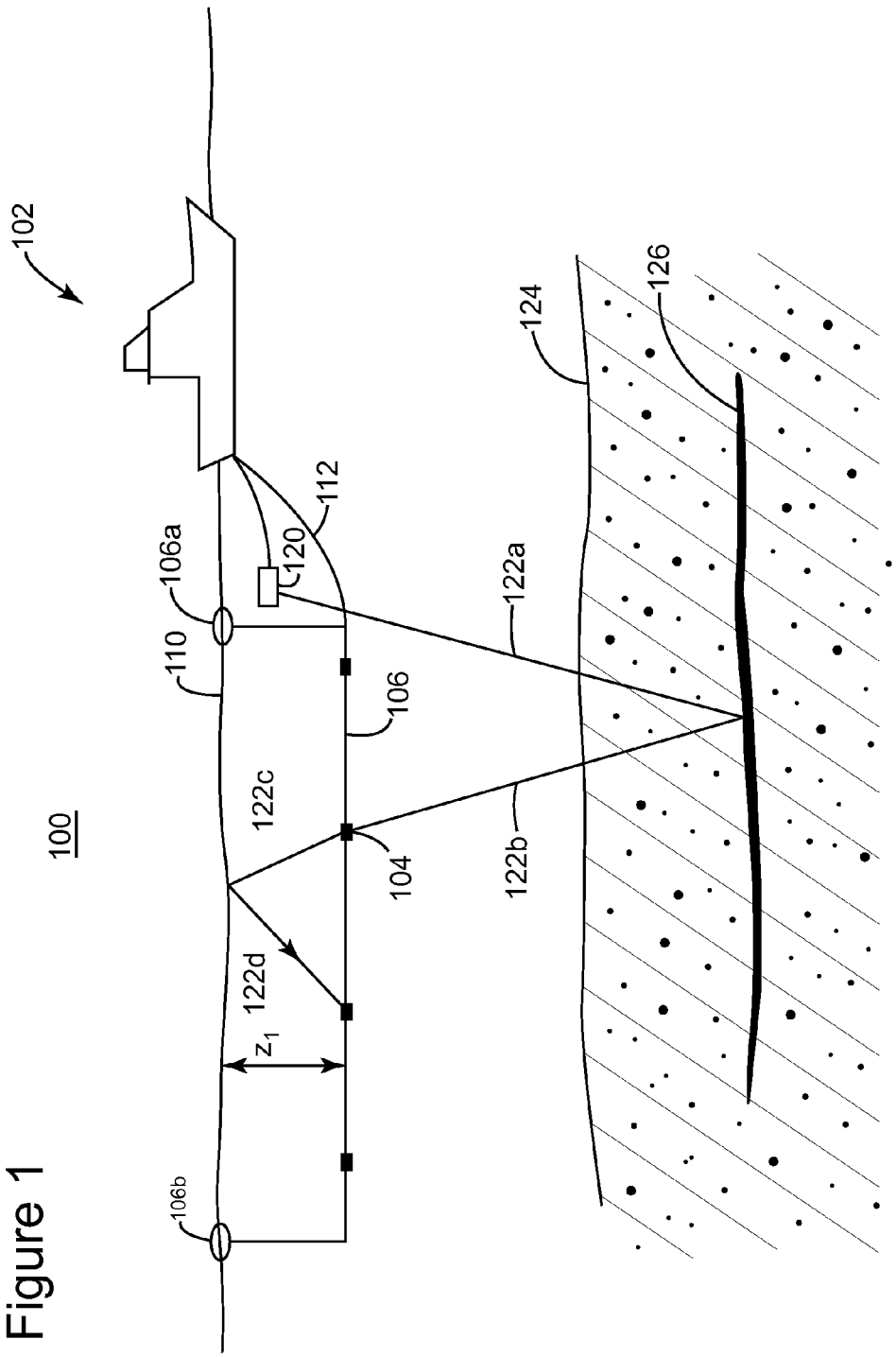
FIG. 1 is a schematic diagram of a conventional seismic data acquisition system having a horizontal streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of pairs of accelerometers. However, the embodiments to be discussed next are not limited to these pairs, but may be applied to other configurations that include single sensors and also may include different types of seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a testing apparatus includes two rotating plates configured so that a rotating center (or point) of a second plate is attached to the first plate so that the second plate can follow a circular trajectory with a constant attitude. A circular trajectory with a constant attitude implies that a reference sign (for example a North-South line) on the second plate maintains its orientation while the second plate executes the circular trajectory. Thus, sensors attached to the second plate follow a circular orbit with a constant attitude when the plates are rotated. Therefore, a working sensor will output a sine or cosine signal. This is not the case if the second plate does not maintain its attitude during the rotation. Alternatively, it is possible to have a single plate that follows a circular trajectory with constant amplitude.

In the field of marine geophysics, acoustic particle velocity sensing is often achieved with geophones (typically electrodynamic velocity sensors). The motion of a neutrally-buoyant streamer is taken to include a good analog of the acoustic particle velocity, at least over some frequency range and some angle of incidence range. To minimize cost and complexity, some vendors use a single-axis gimbaled sensor.

Historically, vertically-oriented wavefronts were in fact the primary concern, but in modern geophysics there is increased interest in wavefronts arriving from a broad range of angles, so the single-axis gimbaled sensor is not optimal. High-quality gimbals are not inexpensive, and even the best introduce the possibility of slip ring noise, and it is common practice to add fluid damping, so the geophone sensor orientation may lag the actual cable orientation in the presence of roll. Such a lag would introduce errors in the measured acoustic particle velocity.

In the case of "solid" cable streamers such as Sercel's Sentinel® streamer, gimbals pose a difficult problem in that the gimbaled sensor needs to have its center of gravity exactly on the cable center of gravity, yet that space is occupied by stress member and electrical wiring. SENTI-NEL® is a registered trademark of Sercel, Inc. A pair of orthogonal particle motion sensors with their active axes passing through the cable axis bypass the geometrical problems as well as the potential for lag and slip ring noise, while also allowing for the possibility of discrimination of other-than-vertical wavefront arrivals. For orthogonal particle motion sensors, separate tilt (rotation) sensing means need to be provided (e.g., accelerometers with adequate DC accuracy) in order to determine direction based on gravity. A pair of orthogonal, high-quality, DC-responsive accelerometers could serve both for velocity sensing and directional sensing.

Irrespective of the type of accelerometer and its purpose in the streamer or any other device, e.g., an ocean bottom cable or an autonomous underwater vehicle, or a land spread that includes particle motion sensors, a method and testing device for verifying that the accelerometer is working is now discussed.

A testing device is provided to generate a substantially circular motion in a plane with a constant attitude (e.g., by conversion from rotary motion or by superposition of orthogonal linear motions). The constant attitude should be understood to mean substantially constant, i.e., a reference sign (real or imaginary) present on the rotating object may slightly oscillate within acceptable margins during the rotation motion. More specifically, considering the reference sign to be a north-south line drawn on a rotating plate, it is understood that while the rotating plate rotates or orbits around a rotating point (which is different from its center point), the north-south line substantially maintains the North-South orientation within a range of +/−10°. This means, that at no point the north-south reference line points East-West. Thus, the concept of circular trajectory or motion with constant attitude is understood in the following to mean that a reference sign, when observed during a circular motion of the plate, substantially maintains its orientation. Also, the concept of circular trajectory with constant attitude is understood in the following to be equivalent to orbiting with constant attitude.

Accelerometers or other vibration sensors clamped to the testing device with sensitive axes in the plane (e.g., substantially parallel to a face of a holding plate) of the circular trajectory generate sinusoidal electrical output in response to the circular trajectory with constant attitude; orthogonally-oriented sensors experience motion of the same magnitude but with a orthogonal (sine/cosine) phase relation while other than orthogonal orientation will exhibit other than orthoghonal phase relations. Analysis of the sensors' electrical output magnitude and phase relations can be used to verify their proper function. Note that small variations in the angular frequency (e.g., due to spring suspension to constrain rotation of the plate; these variations may be shorter that one circular motion duration and have periodic variations from perfect sinusoidal behavior) of the circular trajectory with constant attitude appear as harmonic distortion which can be easily taken into account in the analysis. These embodiments are now discussed next in more detail.

Figure 2A:
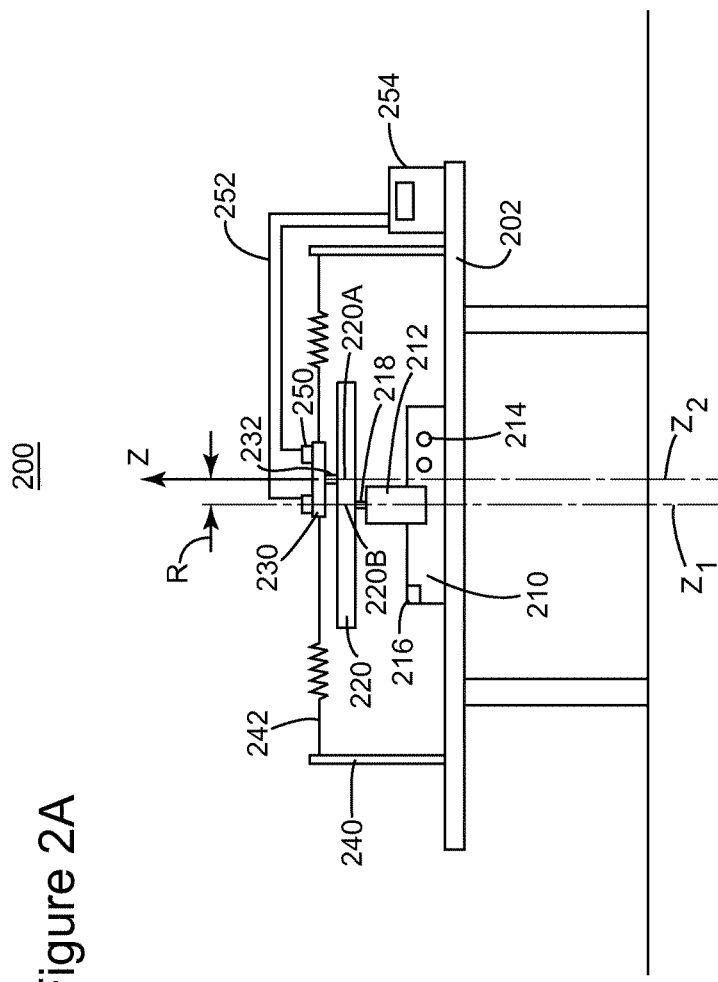
FIG. 2A is a schematic diagram of a testing mechanism according to an embodiment.

According to an embodiment illustrated in FIG. 2A, one or more pairs of accelerometers can be tested with a testing apparatus 200 prior to being attached to the streamer. The accelerometers are placed in the testing apparatus as described with regard to FIGS. 4 and 5. Note that the accelerometers need not be tested in pairs. Testing apparatus 200 may be located on a bench 202 in a given facility that produces the streamer. Testing apparatus 200 may have a base 210 that houses a motor 212. An interface 214 may be electrically connected to motor 212 and a controller (e.g., driver) 216 for controlling the motor's rotation. In one application, both the interface and the controller include just a switch if the motor is a synchronous motor. An axle 218 of motor 212 is fixedly connected to a first rotating plate 220 so that when motor 212 rotates with an angular speed w, the first rotating plate has the same angular speed. For this case, the first rotating plate rotates about its axis Z1. Note that axle 218 and axis Z1 do not need to coincide. Alternatively, axle 218 of motor 212 is connected by a connecting means (e.g., gear, belt, etc.) to first rotating plate 220 so that the two elements have different angular speeds, i.e., axis Z1 of the first rotation plate is offset from axle 218.

A second plate 230 is rotatably attached with a connecting mechanism 232 to first rotating plate 220 in such a way that when first rotating plate 220 rotates around axis Z1, second plate 230 has a circular trajectory with constant attitude around axis Z1 (thus, from now on axis Z1 is referred to orbital axis; also note that axis Z1 is rotational axis for the first plate and orbital axis for the second plate). Second plate 230 may have its own rotational axis Z2. Rotational axis Z2 is substantially parallel with orbital axis Z1 and offset by a given value R from Z1. Thus, in this embodiment, second plate 230 has a circular trajectory with constant attitude around orbital axis Z1 and does not rotate about rotational axis Z2. In reality, there may be some minor oscillatory rotation due to the spring constraints. Connecting mechanism 232 connects second plate 230 to the first rotating plate 220 at a location 220A, which is offset by the predetermined distance R from a location 220B where axle 218 connects to first rotating plate 220 if motor 212 is attached to first rotating plate 220 as shown in FIG. 2A.

Figure 2B:
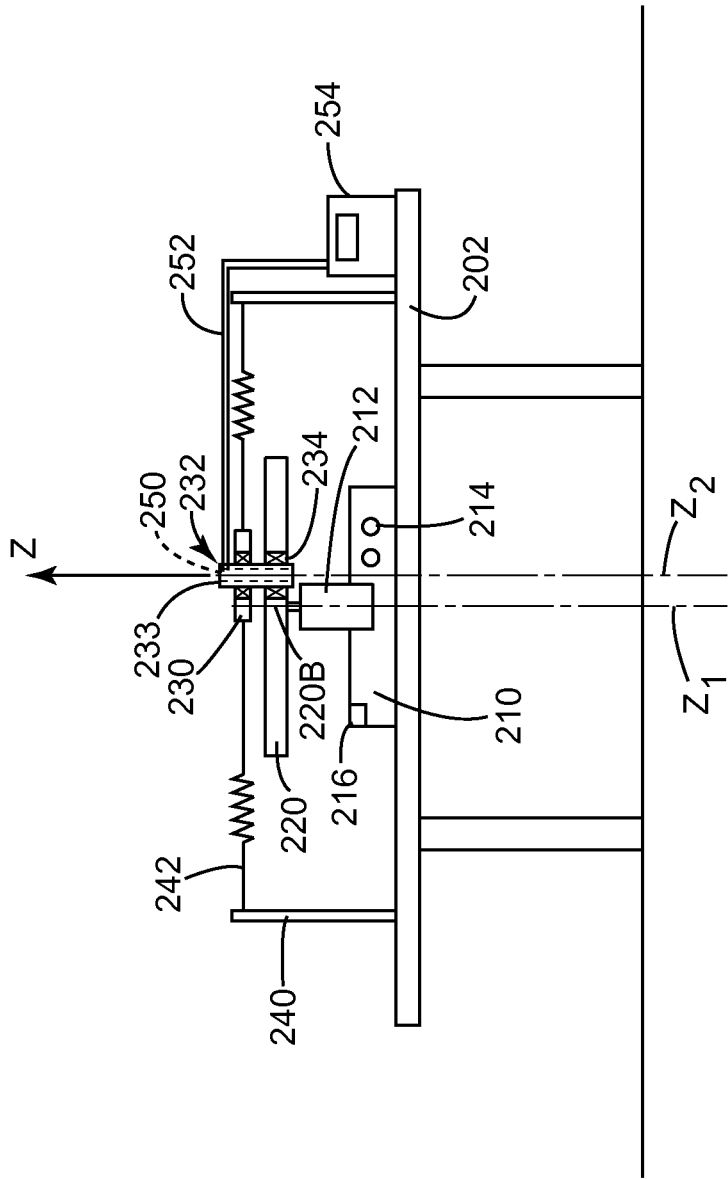
FIG. 2B is a schematic diagram of a testing mechanism according to another embodiment.

In another embodiment illustrated in FIG. 2B, connecting mechanism 232 may include a sensor holder 233 that is configured to receive one or more sensors 250. Sensor 250 may include any particle motion sensor, e.g., accelerometer, or velocity sensor, etc. Sensor holder 233 may extend through first and second plates as indicated in the figure. A large bearing mechanism 234 may be located between first plate 220 and sensor holder 233 (or it may directly connect the first and second plates) and configured to allow sensor holder 233 to rotate relative to first plate 220. However, second plate is fixedly attached to sensor holder in this configuration. This configuration may be advantageous because the testing device introduces less undesired motions due to unbalanced forces (e.g., noise) when sensor 250 is located within first plate 220. Other configurations may be imagined for achieving an orbital motion for sensor 250.

To maintain the attitude of the second plate 230 (i.e., to prevent the second plate from rotating around rotational axis Z2), support structure 240 is attached to bench 202 or to base 210, and spring means 242 (e.g., a spring) connects second plate 230 to support structure 240. In this way, second plate 230 orbits with constant attitude around orbital axis Z1 but does not rotate around rotational axis Z2, although the second plate 230 is capable to rotate around axis Z2 absent spring means 242. One or more sensors 250 may be fixed on second plate 230 and connected through appropriate wires 252 to a measuring device 254 that monitors sensor output in response to the second plate's orbital motion.

Figure 3:
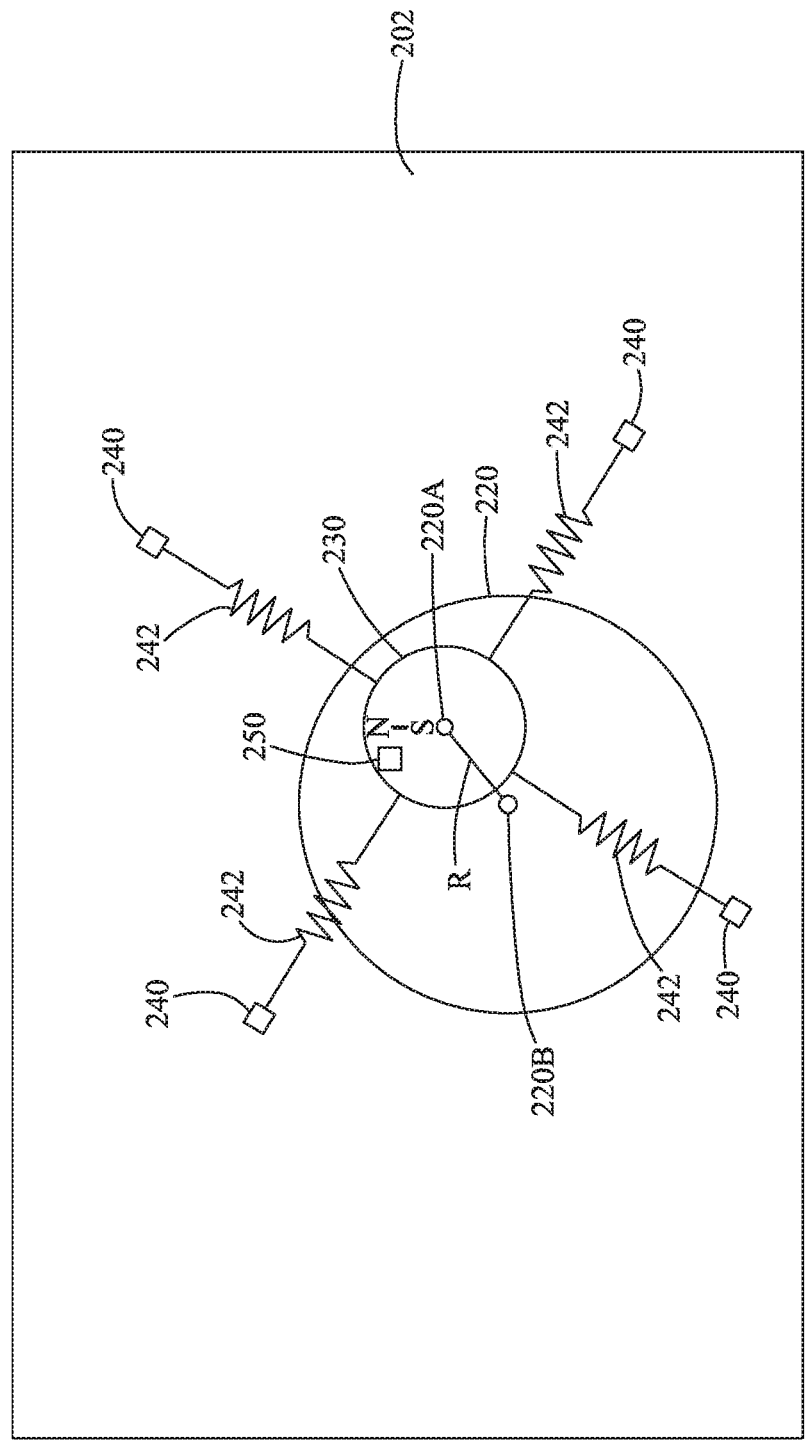
FIG. 3 is a top view of a testing mechanism according to an embodiment.
Figure 4:
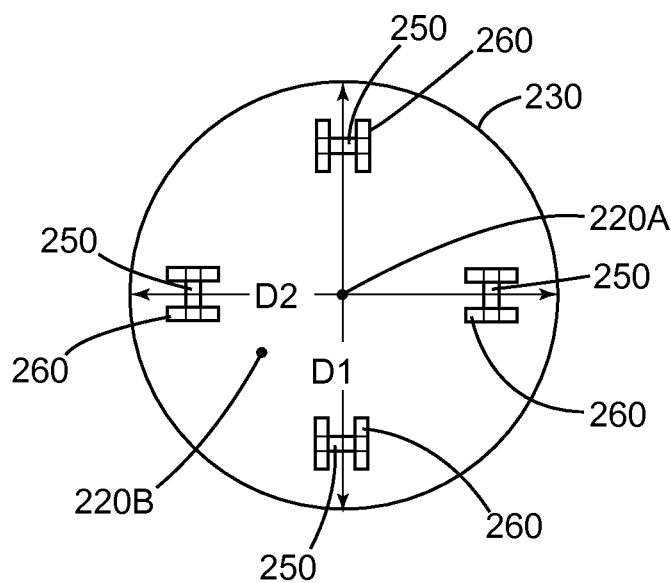
FIG. 4 is a detailed view of a rotating plate of a testing mechanism according to an embodiment.

FIG. 3 shows a top view of testing apparatus 200. Note that first rotating plate 220 and second plate 230 may be disc-shaped. However, other shapes may be used as appropriate. FIG. 3 shows a single sensor 250 for simplicity and a reference sign N-S, on the second plate 230. In one embodiment, four sensors 250 are tested at the same time, and the four sensors 250 are grouped in pairs, on two perpendicular diameters D1 and D2 of the second plate (see FIG. 4). Any other arrangement is possible for the sensors as long as they follow an orbital motion. In one application, each sensor 250 is attached with a gripping mechanism 260 on top of the second plate 230 as illustrated in FIG. 4. Gripping mechanism 260 may act as a vise and may be activated by electric power, compressed air, hydraulically or manually. In another application, a sensor holding device is located on the second plate or to extend through the second plate as illustrated in FIG. 2B and sensor 250 is simply slid inside the sensor holding device.

Figure 5:
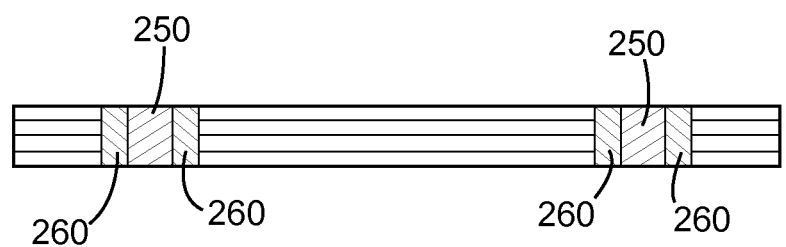
FIG. 5 is another detailed view of a rotating plate of a testing mechanism according to an embodiment.

In another embodiment illustrated in FIG. 5, sensors 250 and gripping mechanisms 260 may be placed, partially or completely inside the second plate 230. This arrangement may reduce spurious motion of the second plate and noise associated with its motion, thus providing the sensors with an inertially favorable location which minimizes out-of-plane vibration. Connecting mechanism 232 may use large-diameter bearings to also minimize noise and out-of-plane vibrations.

Figure 6:
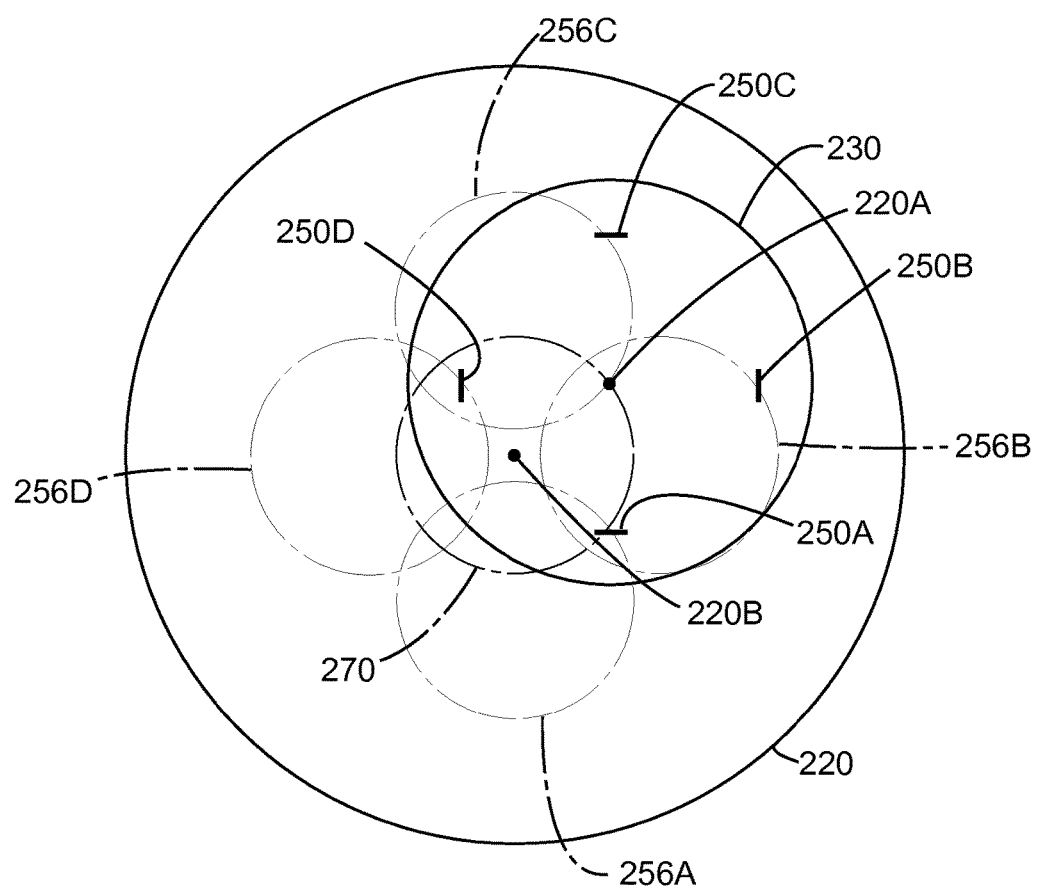
FIG. 6 illustrates the circular orbits of tested sensors according to an embodiment.

When in use, testing apparatus 200 works as follows. Interface 214 and controller 216 are used by the operator to make motor 212 rotate with a given angular speed w, which corresponds to a given frequency f1 of the first plate. Thus, second plate 230 and any sensor 250 attached to it experience a circular trajectory with constant attitude having frequency f2, as illustrated in FIG. 6. The two frequencies may or may not be identical. In other words, rotational axis Z2 of second plate 230 orbits around orbital axis Z1 (i.e., location 220B) along orbit 270, while each sensor 250A to 250D experiences a circular trajectory with constant attitude along a corresponding circle 256A to 256D. In one application, orbit 270 is identical in shape and size to circles 256A to 256D.

Figure 7:
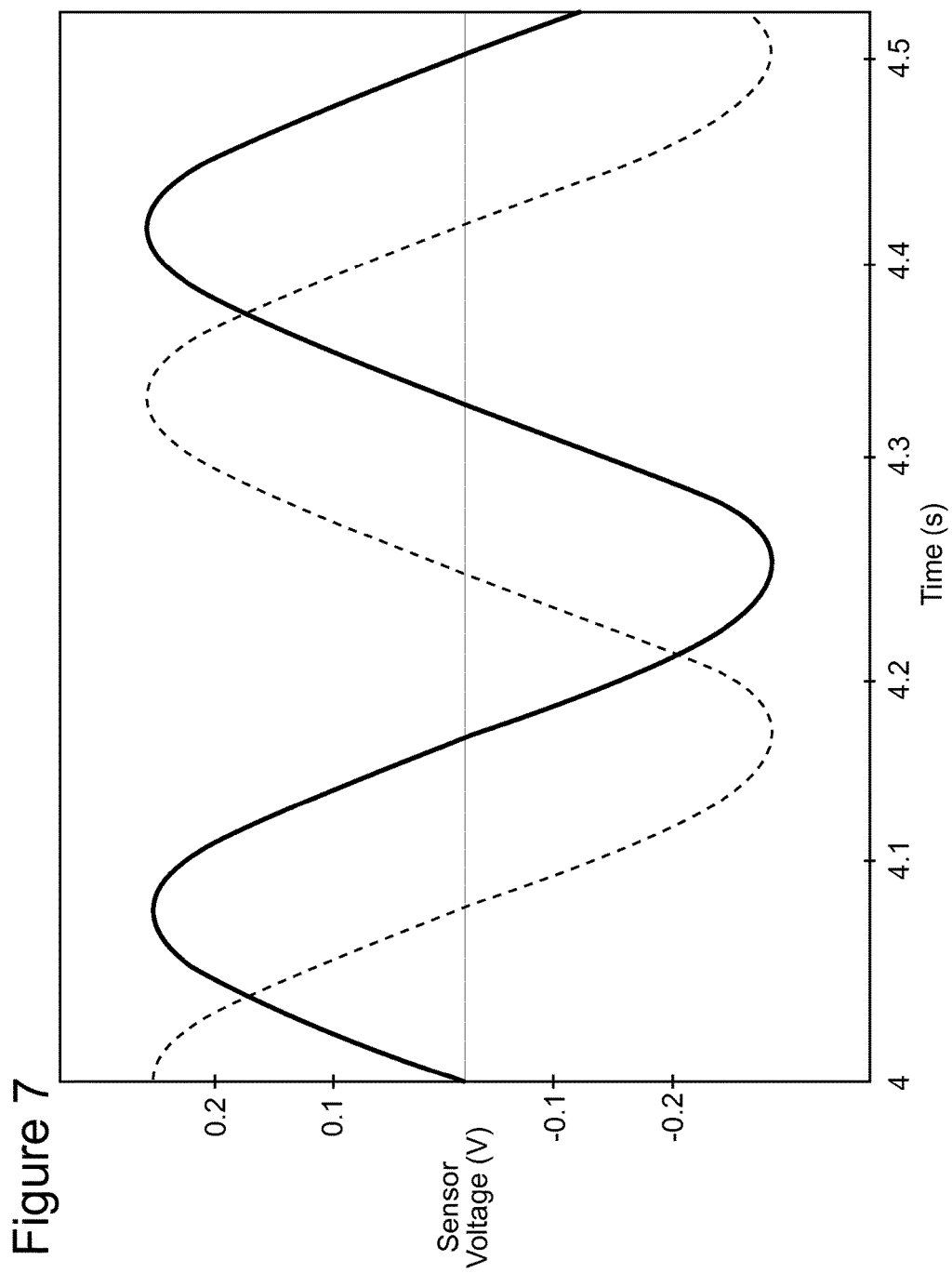
FIG. 7 is a graph illustrating an output of tested sensors according to an embodiment.

This circular trajectory with constant attitude having a given and substantially constant frequency f2 constitutes the excitation (external signal or stimulus) that is applied to each sensor. Because the sensor's motion follows a circular trajectory, the acceleration experienced by each sensor can be calculated from the circular orbit's radius and frequency, and it should appear as a sine motion to one sensor 250A and as a cosine motion to an orthogonal sensor 250B. The sensors can be fixed to second plate 230 with sensor axes in any orientation in a plane substantially parallel to the second plate, due to the symmetry of the circular trajectory. Thus, a properly functioning sensor should exhibit a sine or cosine shape with amplitude within a prescribed range as illustrated in FIG. 7. FIG. 7 illustrates almost perfect sine and cosine motions for the two pairs of orthogonal sensors depicted in FIG. 6.

Mechanical noise and undesired motion due to the second plate connecting mechanism can be mitigated by narrow bandpass filtering of the fundamental frequency in the output signals, e.g., by digital filtering of quantized signals from the sensor under test.

Figure 8:
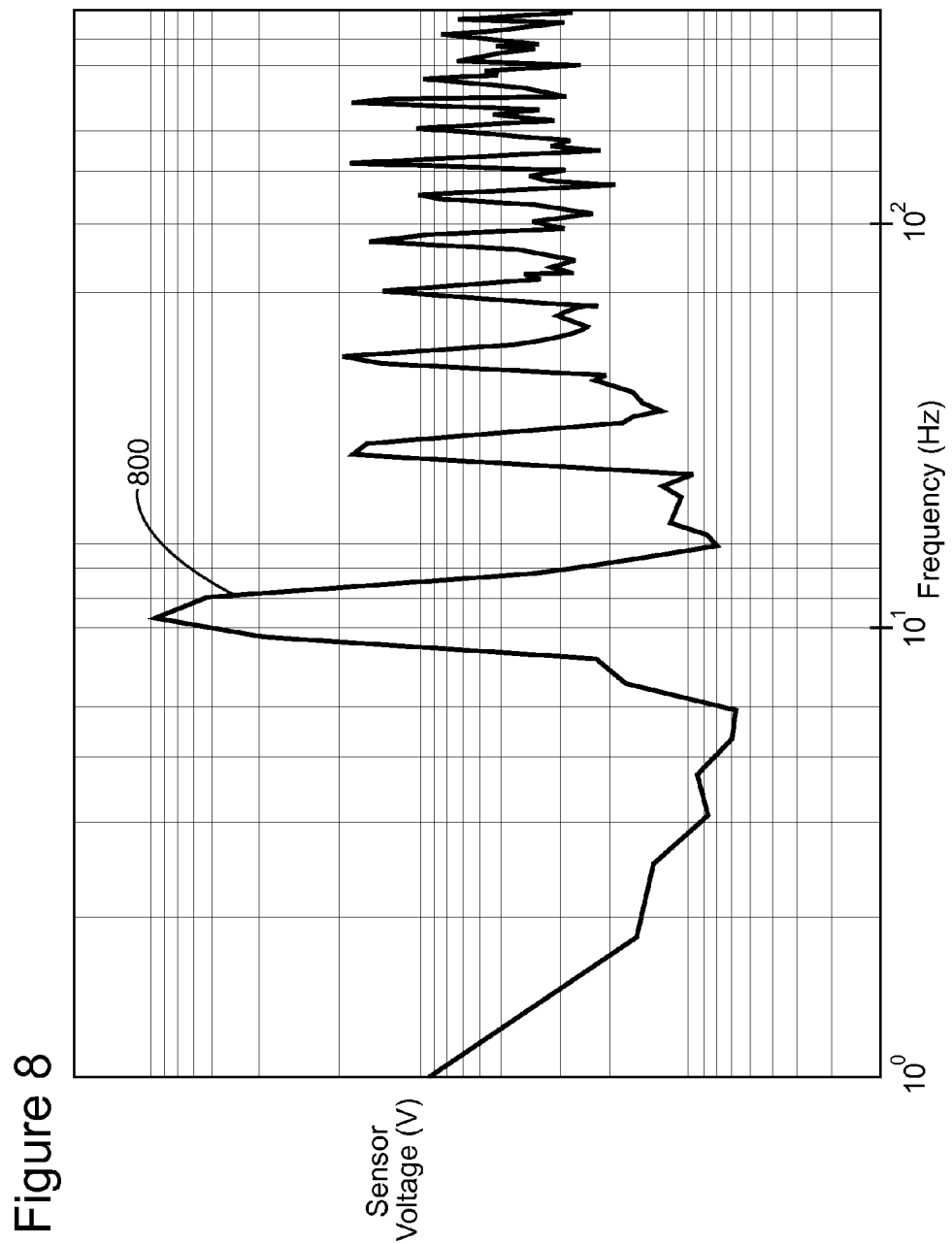
FIG. 8 is a graph illustrating a noise-to-signal ratio of a tested sensor according to an embodiment.

A tested sensor is considered to be adequate if it shows a good signal-to-noise ratio 800 as illustrated, for example, in FIG. 8, which is the signal of a real sensor tested in a crude prototype. The tested sensor is adequate if it also shows good amplitude and phase as illustrated in FIG. 7, which shows ideal sinusoids.

Figure 9:
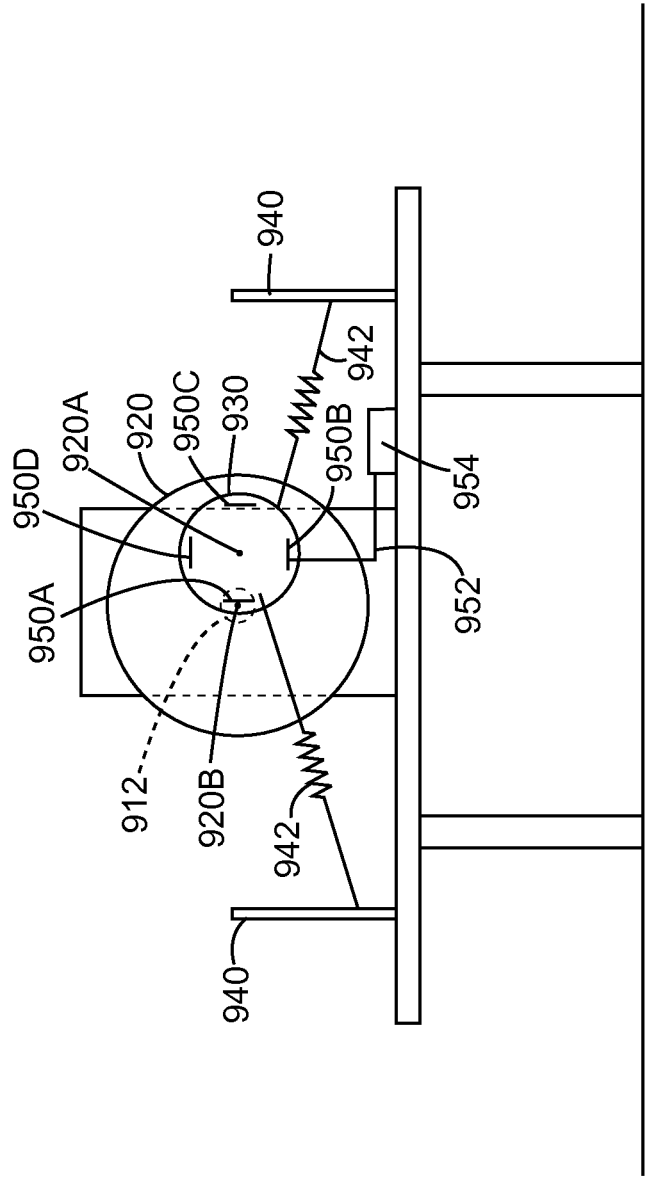
FIG. 9 is a schematic diagram of another testing mechanism according to an embodiment.

Testing apparatus 200 does not have to lie horizontally on bench 202. In an embodiment illustrated in FIG. 9, a testing apparatus 900 lies vertically, i.e., first rotating plate 920 and second plate 930 extend in a vertical plane. The results obtained with testing apparatus 900 are identical to those obtained with apparatus 200.

Figure 10:
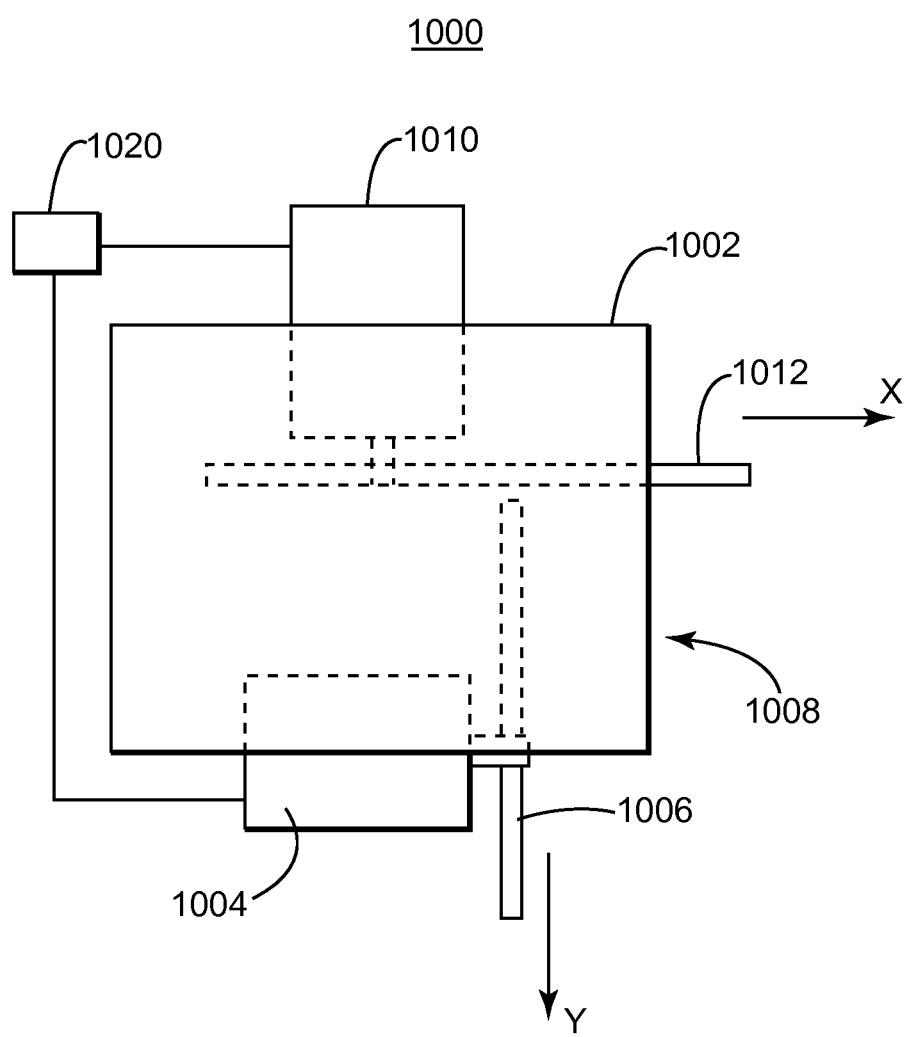
FIG. 10 is a flowchart of a method for testing a sensor according to an embodiment.

In another embodiment illustrated in FIG. 10, instead of having first and second plates as illustrated in FIGS. 2A and 2B, a testing device 1000 has a payload mounting plate 1002 attached to a motor 1004 that is configured to drive it along track 1006. Payload mounting plate 1002 together with motor 1004 and track 1006 form a stage 1008 that is actuated by one or more motors 1010 along another track 1012. Track 1006 is configured to be substantially perpendicular to track 1012. If both motors 1004 and 1010 are linear motors and are coordinated by a controller 1020, they achieve a circular trajectory with constant attitude for plate 1002. This circular trajectory may be a circle or have another shape, e.g., elliptical. Thus, by attaching a desired number of sensors to plate 1002 and linearly moving motors 1004 and 1010, the circular trajectory with constant attitude is achieved and sensors are tested as discussed above. Those skilled in the art would appreciate that other mechanisms may be imagined that achieve a circular trajectory with constant attitude as discussed in the embodiments above.

Figure 11:
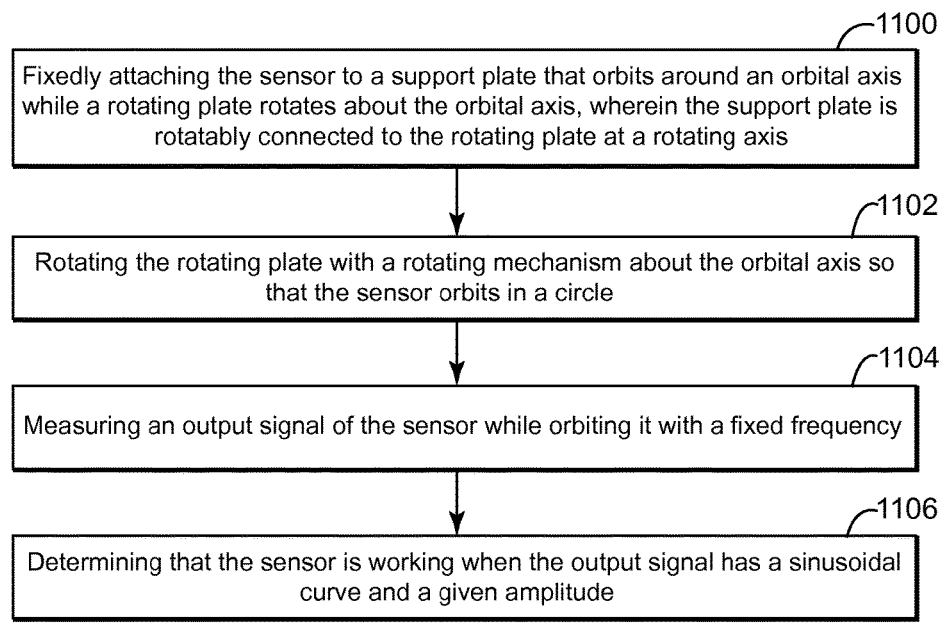
FIG. 11 is a schematic diagram of a computing device.

According to an embodiment illustrated in FIG. 11, there is a method for testing a sensor. The method includes a step 1100 fixedly attaching the sensor (250) to a support plate (230) that executes a circular trajectory with constant attitude around an orbital axis (Z1) while a rotating plate (220) rotates about the orbital axis (Z1), wherein the support plate (230) is rotatably connected to the rotating plate (220) at a rotating axis (Z2); a step 1102 of rotating the rotating plate (220) with a rotating mechanism (212) about the orbital axis (Z1) so that the sensor (250) follows a circular trajectory with constant attitude; a step 1104 of measuring an output signal of the sensor (250) while executing the circular trajectory with constant attitude with a fixed frequency; and a step 1106 of determining that the sensor (250) is working when the output signal has a sinusoidal curve and a given amplitude.

Figure 12:
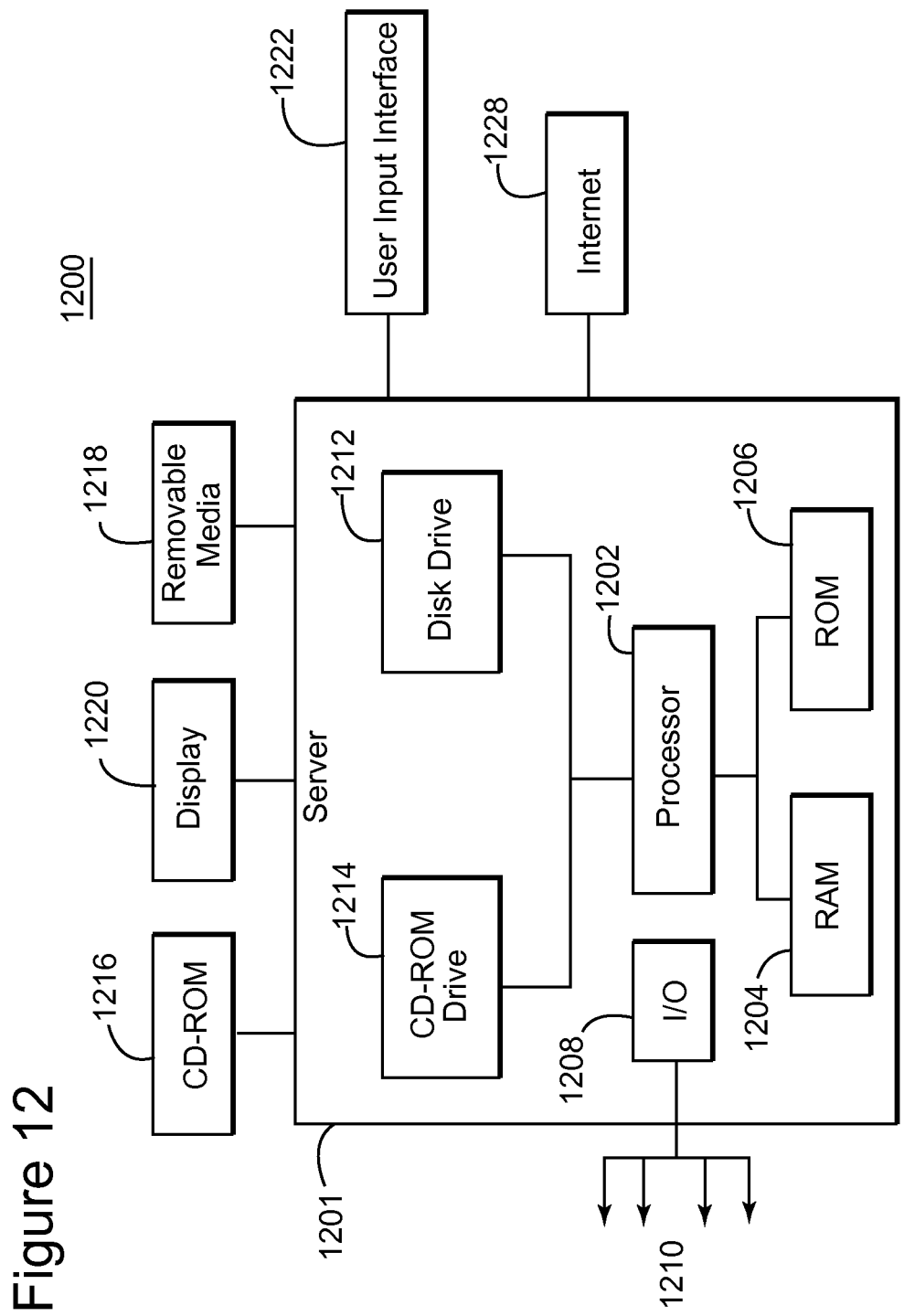
FIG. 12 is a schematic diagram of a computing device.

The above discussed procedures and methods may be implemented in a computing device as illustrated in FIG. 12. Hardware, firmware, software or a combination thereof may be used to perform the various steps and operations described herein. The computing device 1200 of FIG. 12 is an exemplary computing structure that may be used in connection with such a system.

The exemplary computing device 1200 suitable for performing the activities described in the exemplary embodiments may include a server 1201. Such a server 1201 may include a central processor (CPU) 1202 coupled to a random access memory (RAM) 1204 and to a read-only memory (ROM) 1206. ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210 to provide control signals and the like. Processor 1202 carries out a variety of functions as are known in the art, as dictated by software and/or firmware instructions.

Server 1201 may also include one or more data storage devices, including hard and floppy disk drives 1212, CD-ROM drives 1214, and other hardware capable of reading and/or storing information such as DVD, etc. In one embodiment, software for carrying out the above-discussed steps may be stored and distributed on a CD-ROM 1216, removable media 1218 or other form of media capable of storing information, portably or not. These storage media may be inserted into, and read by, devices such as CD-ROM drive 1214, disk drive 1212, etc. Server 1201 may be coupled to a display 1220, which may be any type of known display or presentation screen, such as LCD display, plasma display, cathode ray tubes (CRT), etc. A user input interface 1222 is provided, including one or more user interface mechanisms such as a mouse, keyboard, microphone, touch pad, touch screen, voice-recognition system, etc.

Server 1201 may be coupled to other devices, such as sources, detectors, etc. The server may be part of a larger network configuration as in a global area network (GAN) such as the Internet 1228, which allows ultimate connection to various landline and/or mobile computing devices.

The disclosed exemplary embodiments provide an apparatus and a method for testing a seismic sensor prior to being deployed within a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A testing device for testing a sensor, the testing device comprising:
   a rotating mechanism;
   a first rotating plate connected to the rotating mechanism so that the first rotating plate rotates around an orbital axis (Z1);
   a second plate rotatably attached to the first rotating plate at a rotating point, the second plate having a rotational axis (Z2) offset from the orbital axis (Z1) by a predetermined distance R; and
   a gripping mechanism attached to the second plate and configured to receive and fix the sensor relative to the second plate,
   wherein the second plate follows a circular trajectory with constant attitude around the orbital axis (Z1), and
   wherein the constant attitude is associated with a reference sign on the second plate and the reference sign's orientation is maintained relative to a given geographical marker while the second plate follows the circular trajectory.

2. The testing device of claim 1, further comprising:
   a support structure; and
   attaching means configured to attach the second plate to the support structure so that the second plate follows the circular trajectory with constant attitude.

3. The testing device of claim 2, wherein the attaching means include an elastic component that allows the second plate to follow the circular trajectory with constant attitude.

4. The testing device of claim 2, wherein the second plate orbits around the orbital axis with a radius equal to the predetermined distance.

5. The testing device of claim 1, further comprising:
the sensor fixedly attached to the second plate by the gripping mechanism so that the sensor follows the circular trajectory with constant attitude, wherein a sensitive axis of the sensor is substantially parallel to a face of the second plate.

6. The testing device of claim 5, wherein the rotating mechanism rotates the sensor with a fixed frequency along a circle so that an input signal detected by the sensor corresponds to a sinusoidal signal.

7. The testing device of claim 6, further comprising:
leads connecting the sensor to a measuring device for measuring an output signal determined by the sensor.

8. The testing device of claim 1, wherein the rotating mechanism is an electrical motor and the sensor is an accelerometer.

9. The testing device of claim 1, wherein the second plate has one or more holes for receiving the sensor so that the sensor is partially located within the second plate.

10. The testing device of claim 1, wherein two pairs of sensors are mounted on the second plate in an orthogonal manner for testing.

11. The testing device of claim 10, wherein each sensor of the two pairs performs a circular motion with a radius equal to the predetermined distance R.

12. A method for testing a sensor, the method comprising:
fixedly attaching the sensor to a support plate that follows a circular trajectory with constant attitude around an orbital axis (Z1) while a rotating plate rotates about the orbital axis (Z1), wherein the support plate is rotatably connected to the rotating plate at a rotating axis (Z2);
rotating the rotating plate with a rotating mechanism about the orbital axis (Z1) so that the sensor rotates in a circle;
measuring an output signal of the sensor while rotating in circle with a fixed frequency; and
determining that the sensor is working when the output signal has a sinusoidal curve and a given amplitude,
wherein the constant attitude is associated with a reference sign on the support plate and the reference sign's orientation is maintained relative to a given geographical marker while the support plate follows the circular trajectory.

13. The method of claim 12, further comprising:
fixedly attaching the sensor with a gripping mechanism to the support plate so that a sensitive axis of the sensor is in a plane substantially parallel to a face of the second plate.

14. The method of claim 12, further comprising:
attaching the support plate to a fixed support structure with attaching means so that the support plate follows the circular trajectory with constant attitude.

15. The method of claim 14, wherein the attaching means include an elastic component that allows the support plate to follow the circular trajectory with constant attitude.

16. The method of claim 12, wherein the support plate rotates around a first rotating point with a radius equal to a non-zero distance between the first rotating point and a second rotating point.

* * * * *